(12) United States Patent
Sato

(10) Patent No.: US 11,451,690 B2
(45) Date of Patent: Sep. 20, 2022

(54) CLEANING APPARATUS AND CLEANING METHOD FOR AN IMAGE SENSOR

(71) Applicant: CANON KABUSHIKI KAISHA, Tokyo (JP)

(72) Inventor: Yohei Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 16/569,400

(22) Filed: Sep. 12, 2019

(65) Prior Publication Data

US 2020/0099826 A1    Mar. 26, 2020

(30) Foreign Application Priority Data

Sep. 20, 2018   (JP) .............................. JP2018-176519

(51) Int. Cl.
| | |
|---|---|
| *H04N 5/217* | (2011.01) |
| *H04N 1/00* | (2006.01) |
| *H04N 5/225* | (2006.01) |
| *B08B 1/00* | (2006.01) |
| *B08B 5/02* | (2006.01) |

(Continued)

(52) U.S. Cl.
CPC ........... *H04N 5/2171* (2013.01); *B08B 1/006* (2013.01); *B08B 1/008* (2013.01); *B08B 5/02* (2013.01); *G05B 11/00* (2013.01); *G05B 19/00* (2013.01); *H04N 1/00909* (2013.01); *H04N 5/2257* (2013.01); *H04N 5/22521* (2018.08); *G03B 17/56* (2013.01)

(58) Field of Classification Search
CPC ............. H04N 5/2171; H04N 5/22521; H04N 5/2257; H04N 1/00909; B08B 1/006; B08B 1/008; B08B 5/02; B08B 13/00; G05B 11/00; G05B 19/00; G02B 27/0006; G03B 17/56
USPC .................................................. 348/373–376
See application file for complete search history.

(56) References Cited

U.S. PATENT DOCUMENTS

| | | | | |
|---|---|---|---|---|
| 7,222,388 | B2 * | 5/2007 | Sugihara ................ | G03B 17/56 15/310 |
| 2004/0200027 | A1 * | 10/2004 | Sugihara ................ | G03B 17/56 15/301 |

(Continued)

FOREIGN PATENT DOCUMENTS

| | | | | |
|---|---|---|---|---|
| JP | | 4537105 B2 | 9/2010 | |
| WO | WO-2017216963 A1 * | | 12/2017 | ............... B08B 5/00 |

OTHER PUBLICATIONS

Peng Zhang, in Advanced Industrial Control Technology, 2010, Published by Elsevier, Chapter 3—Sensors and Actuators, pp. 76-78 (3.1.2 Light Section Sensors, Figures 3.3 & 3.4) and pp. 91-92 (Table 3.2 Distance Sensors, See Optical & Photoelectric) E-Book Weblink: https://www.sciencedirect.com/science/article.*

*Primary Examiner* — Twyler L Haskins
*Assistant Examiner* — Akshay Trehan
(74) *Attorney, Agent, or Firm* — Canon U.S.A., Inc. I.P. Division

(57) ABSTRACT

A cleaning apparatus that includes a cleaning member and cleans a detection surface of a detection element included in a detection device includes a fixing unit configured to fix the detection device attached to the cleaning apparatus, an adjustment mechanism configured to adjust a position of the detection device with respect to the cleaning apparatus and a measurement unit configured to measure a position and an inclination of the detection element of the detection device.

8 Claims, 9 Drawing Sheets

(51) Int. Cl.
*G03B 17/56* (2021.01)
*G05B 11/00* (2006.01)
*G05B 19/00* (2006.01)

(56) References Cited

U.S. PATENT DOCUMENTS

| | | | | |
|---|---|---|---|---|
| 2005/0129394 | A1* | 6/2005 | Ichikawa | G03B 17/48 |
| | | | | 396/429 |
| 2005/0275738 | A1* | 12/2005 | Arai | B08B 5/02 |
| | | | | 348/335 |
| 2007/0188649 | A1* | 8/2007 | Hagihara | G03B 17/02 |
| | | | | 348/335 |
| 2007/0195185 | A1* | 8/2007 | Onuki | H04N 5/232941 |
| | | | | 348/333.02 |
| 2013/0048036 | A1* | 2/2013 | Jonas | B60S 1/0848 |
| | | | | 134/167 R |
| 2015/0202663 | A1* | 7/2015 | Oba | B08B 5/02 |
| | | | | 348/375 |
| 2018/0009418 | A1* | 1/2018 | Newman | B60S 1/485 |
| 2019/0135239 | A1* | 5/2019 | Rice | B05B 1/08 |
| 2019/0243170 | A1* | 8/2019 | Yamazaki | B08B 5/02 |

\* cited by examiner

CLEANING APPARATUS AND CLEANING METHOD FOR AN IMAGE SENSOR

BACKGROUND OF THE INVENTION

Field of the Invention

The present disclosure relates to a cleaning apparatus and a cleaning method for cleaning a detection surface of a detection element that detects a physical quantity of light or an electromagnetic wave.

Description of the Related Art

There are situations with detection elements where erroneous detection can occur due to foreign particles adhering to the detection surface of a detection element. For example, in a digital camera having an image sensor where photoelectric converters each serving as a light receiving element are arranged side by side, an image capturing surface of the image sensor is regularly cleaned to prevent a deterioration in the quality of an image to be obtained. If a user cleans the image capturing surface by him/herself, however, there is a possibility that the user may accidentally damage the image capturing surface. Thus, in general, a user takes an image sensor to a service store run by a manufacturer and have a trained operator clean the imaging surface of the image sensor. However, the accuracy of cleaning work varies depending on the difference in skill among trained operators. Considering such a situation, Japanese Patent No. 4537105 discusses an apparatus that is connected to a camera to clean the front surface of an imaging surface by wiping the surface using wind pressure or an adhesive sheet.

SUMMARY OF THE INVENTION

According to an aspect of the present disclosure, a cleaning apparatus that includes a cleaning member and cleans a detection surface of a detection element included in a detection device includes a fixing unit configured to fix the detection device attached to the cleaning apparatus, an adjustment mechanism configured to adjust a position of the detection device with respect to the cleaning apparatus and a measurement unit configured to measure a position and an inclination of the detection element of the detection device.

According to another aspect of the present disclosure, a control method for a cleaning apparatus that includes a cleaning member and cleans a detection surface of a detection element included in a detection device includes fixing the detection device attached to the cleaning apparatus, measuring a position and an inclination of the detection element of the detection device and adjusting an adjustment mechanism that adjusts a position of the detection device with respect to the cleaning apparatus, based on a result of measurement in the measuring.

According to yet another aspect of the present disclosure, a control method for a cleaning apparatus that includes a cleaning member and cleans a detection surface of a detection element included in a detection device includes measuring a position and an inclination of the detection element in a state where the detection device is attached to the cleaning apparatus and notifying adjustment information based on a result of measurement in the measuring.

Further features of the present disclosure will become apparent from the following description of exemplary embodiments with reference to the attached drawings.

DESCRIPTION OF THE EMBODIMENTS

Embodiments of the present invention will be described in detail below with reference to the attached drawings.

Japanese Patent No. 4537105 does not sufficiently discuss how to control a cleaning apparatus to remove foreign particles on a detection surface. Removing foreign particles adhering to a detection surface is inherent not only in an image sensor, but also in a general detection element including a detection surface for detecting a physical quantity. Thus, there is similarly a demand for use of a cleaning apparatus for the detection element.

In addition, to enable a single cleaning apparatus to clean various types of detection devices (detection elements), the cleaning apparatus needs to flexibly support, for example, the size of a detection surface of a detection element and the position of the detection surface in a detection device. Therefore, the present invention is directed to a cleaning apparatus and a cleaning method that are capable of appropriately removing foreign particles adhering to a detection surface, for various types of detection elements.

Figure 1A:
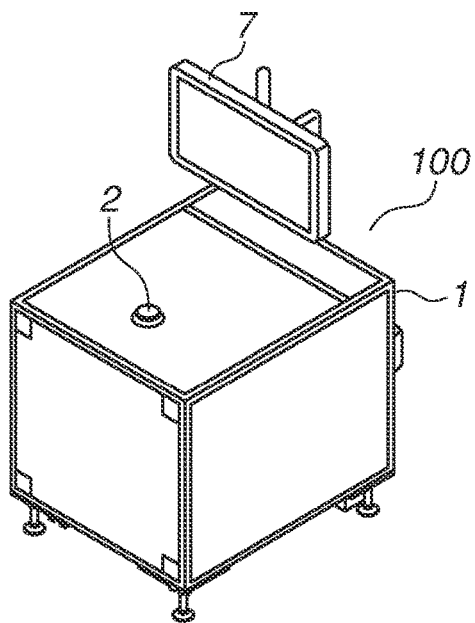
FIGS. 1A, 1B, and 1C illustrate an external view, a perspective view, and a rear view, respectively, of a cleaning apparatus according to an exemplary embodiment.
Figure 1B:
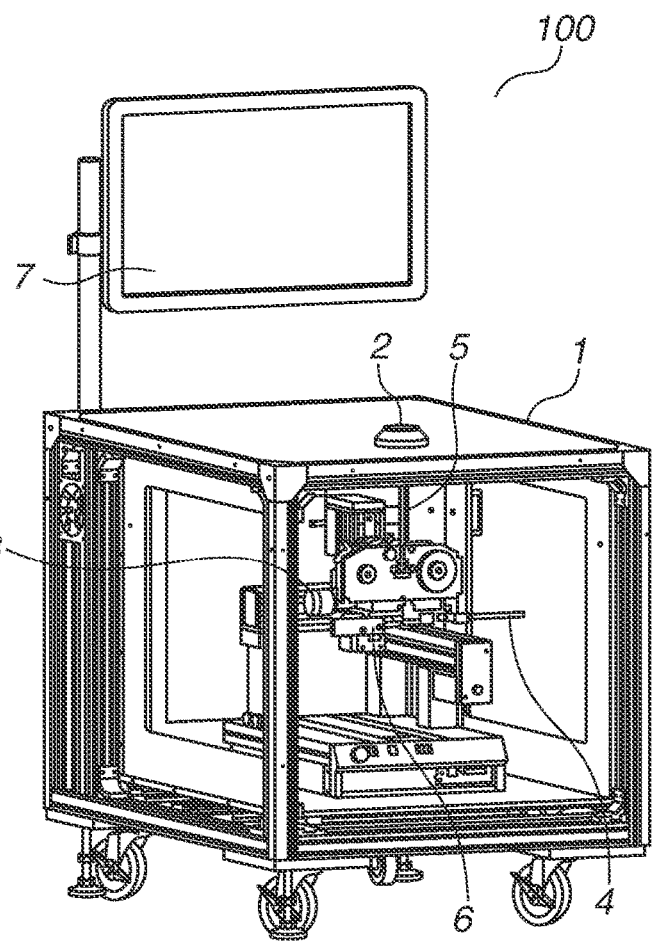
Figure 1C:
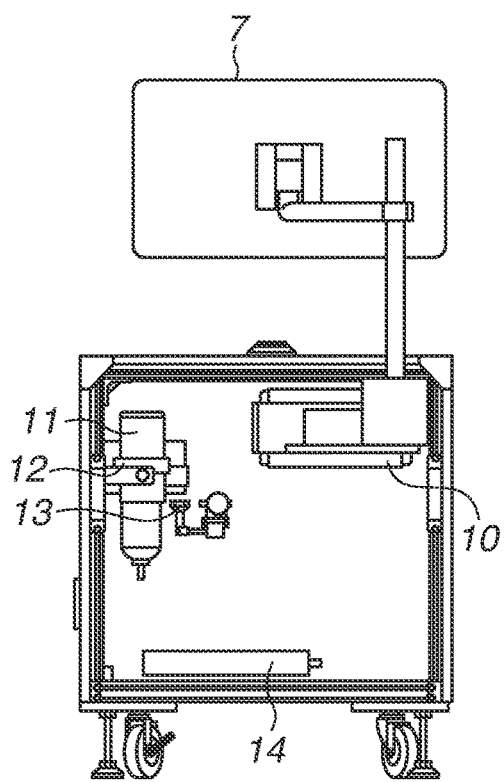

A first exemplary embodiment will be described below. FIGS. 1A, 1B, and 1C illustrate a cleaning apparatus 100 as an example of a cleaning apparatus according to the present exemplary embodiment. In the present exemplary embodiment, the cleaning apparatus 100 will be described as, for example, a cleaning apparatus for cleaning an image capturing surface of an image sensor configured of a sensor, such as a complementary metal oxide semiconductor (CMOS) sensor, included in a digital camera.

FIG. 1A is an external view of the cleaning apparatus 100. The cleaning apparatus 100 has a main body 1 including a metal chassis, a fixing unit 2 that fixes a detection device (in the present exemplary embodiment, a camera) serving as a cleaning target, and a display unit 7 that displays various kinds of information. The display unit 7 may be configured as a separate unit for communicating with the cleaning apparatus 100.

FIG. 1B is a diagram illustrating a configuration of inside of the cleaning apparatus 100. A movable base 6 is integrally provided with a check unit 3, a first cleaning member 4, and a second cleaning member 5. The movable base 6 can freely change the position of each of these components by three-dimensionally translating and rotating. In particular, the movable base 6 has a translation mechanism that enables vertical translation, so that each of the components can approach the position of the fixing unit 2, i.e., an image sensor surface (a detection surface) after attachment of a camera 200 (see FIG. 2), and can retract to the cleaning apparatus 100 side.

The fixing unit 2 includes a ring-shaped metallic member and is disposed on an exterior face of the main body 1. In the present exemplary embodiment, the fixing unit 2 has a structure that enables a camera mount of the camera serving as the cleaning target to be attached to and fixed by the fixing unit 2. The camera mount is provided for attaching and detaching an interchangeable lens thereto and therefrom during normal use of the camera. Further, the fixing unit 2 includes an electrical connection terminal by which the fixing unit 2 communicates with a camera to be attached.

In the present exemplary embodiment, an adjustment mechanism is provided between the fixing unit 2 and the main body 1. This adjustment mechanism (to be described in detail below with reference to FIGS. 8A and 8B) is provided to adjust the positional relationship between an image sensor 22 (see FIG. 2) and each of the cleaning members, after the camera 200 is fixed to the fixing unit 2. Further, the fixing unit 2 includes a ring-shaped illuminator for securing a light quantity during monitoring the state of cleaning by the cleaning apparatus 100, and irradiates a detection element (the image sensor of the camera) to be cleaned with light when the first cleaning member 4 and the second cleaning member 5 clean the detection element. An appropriate shape of the fixing unit 2 varies depending on the type of an external device to be attached. Therefore, the fixing unit 2 may be configured to be detachable from the main body 1 and replaced with another one to match with an external device to be connected. Alternatively, a number of fixing units 2 corresponding to the number of types of external apparatuses that are assumed to be connected may be provided.

In the present exemplary embodiment, attachment of the camera is detected by using a connection terminal in the camera mount of the camera to be attached. In other words, the attachment of the camera to the cleaning apparatus 100 is detected based on electrical connection established between the connection terminal of the fixing unit 2 and the connection terminal of the camera mount.

The first cleaning member 4 is a cleaning tool that performs non-contact type cleaning on a detection element surface. In the present exemplary embodiment, the first cleaning member 4 blows foreign particles off with wind pressure by injecting air.

The second cleaning member 5 is a cleaning tool that performs contact-type cleaning on the detection element surface. In the present exemplary embodiment, the second cleaning member 5 catches foreign particles by performing wipe cleaning using a wiper.

FIG. 1C is a diagram illustrating an internal configuration of the cleaning apparatus 100 as viewed from the rear side thereof. Normally, a cover is attached to an outer housing to cover each of the components installed in an inner housing. A control unit 10 includes a computer including a central processing unit (CPU), and controls the operation of the entire cleaning apparatus 100. The control unit 10 performs processing of information from each of the components and provides an instruction to each of the components.

When air to be used for the first cleaning member 4 is injected from a device such as an external pump via an inlet 12, an air filter 11 reduces foreign particles and oil in the air. The air passing through the air filter 11 is supplied to the first cleaning member 4. Without the air filter 11, there is a possibility that foreign particles contained in the air are blown toward the detection surface of the detection element. A pressure gauge 13 measures the pressure of the injected air and displays the measured pressure. A user can adjust the pressure to an appropriate pressure whenever necessary, by viewing the pressure indicated by the pressure gauge 13.

A power source 14 supplies power to the entire cleaning apparatus 100. The power source 14 may have a function of feeding power to an external device via an interface (such as the electrical connection terminal of the fixing unit 2, or a communication unit 17, in the present exemplary embodiment).

Figure 2:
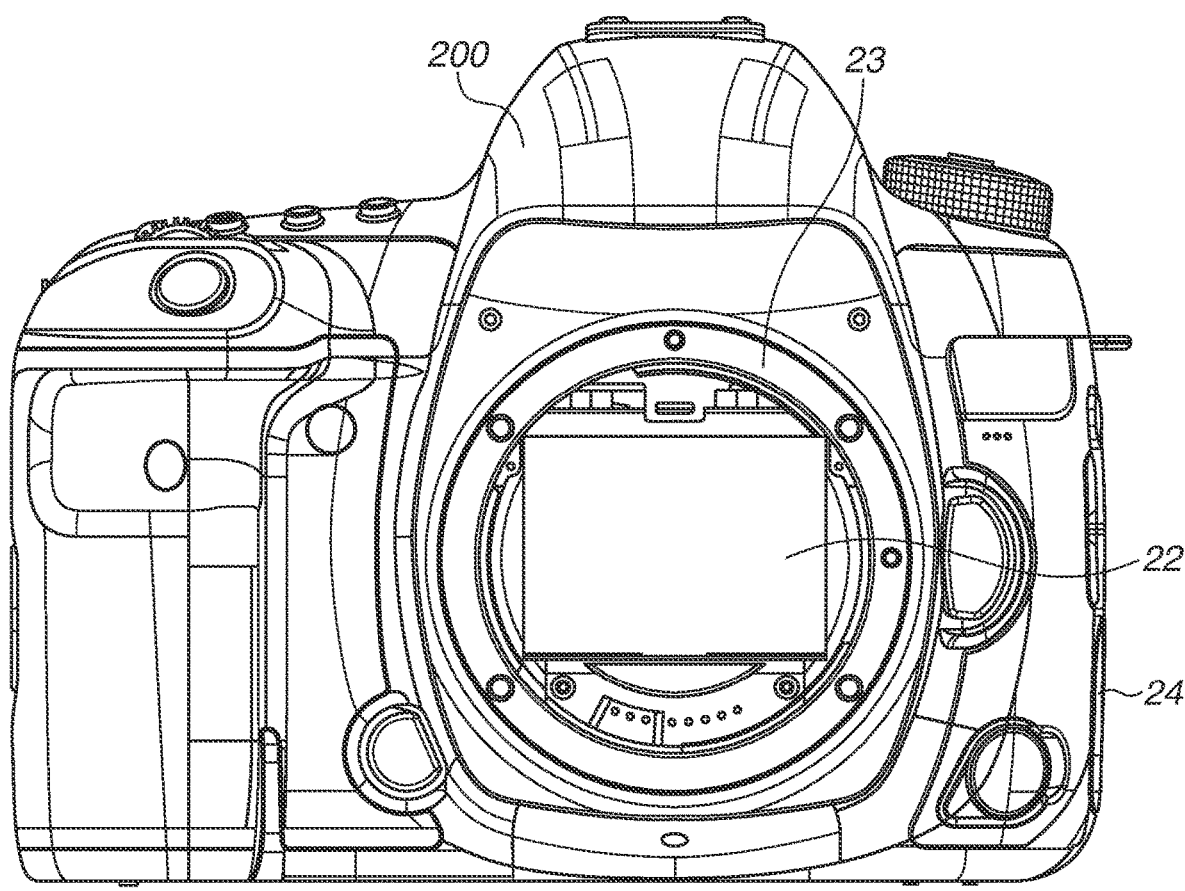
FIG. 2 is a front view of an imaging apparatus according to the present exemplary embodiment.

FIG. 2 illustrates the camera 200 serving as an example of the device having the image sensor that is the detection element to be cleaned. In the present exemplary embodiment, the camera 200 is a digital single-lens reflex camera of interchangeable-lens type. A camera communication unit 24 has a connection terminal compliant with a communication standard on the inner side of the cover. The camera communication unit 24 is connected to the communication unit of the cleaning apparatus 100 using a cable such as a universal serial bus (USB) and thereby performs communication in a state where the camera communication unit 24 is electrically connected to the cleaning apparatus 100. In a case where the external device is a lens, lens control is performed by a camera control unit (not illustrated) and various kinds of information about the lens and the camera 200 are exchanged. The image sensor 22 generates digital image data by receiving object light and converting the received object light into an electrical signal. In the present exemplary embodiment, the CMOS sensor is used for the image sensor 22, but various forms such as a charge coupled device (CCD) sensor and a charge injection device (CID) sensor can be also used. Further, the cleaning target is not limited to the light receiving element, and a detection element in any form can be the cleaning target of the present cleaning apparatus, if the detection element is has a function of performing detection on a pixel surface, such as a detection element that detects electromagnetic waves such as X-rays. Furthermore, the image sensor 22 has a structure in which, for example, a cover glass, an infrared (IR) cut filter, and a low-pass filter (LPF) are stacked on photodiodes in a thickness direction of the image sensor 22, and the cleaning apparatus 100 cleans the uppermost surface of the structure.

Next, a configuration of connection between the cleaning apparatus 100 and the detection device according to the present exemplary embodiment will be described with reference to FIG. 1B and FIG. 2.

The camera 200 is fixed by connecting a camera fixing unit 23 of the camera 200 to the fixing unit 2 of the cleaning apparatus 100. The control unit 10 can control the camera 200 by performing communication with a camera control unit 21 to be described below, via the communication unit 17 and the camera communication unit 24. For example, the cleaning apparatus 100 can determine a camera model and control imaging operation, such as an operation for moving a mirror and a shutter, on the camera 200 side.

In FIG. 1B, the second cleaning member 5 is oriented in the direction of the fixing unit 2. The movable base 6 has the translation mechanism for vertical translation. Therefore, the second cleaning member 5 passes through the center of the ring of the fixing unit 2 and approaches the image sensor 22 in a state where the camera 200 is physically connected.

In addition, the movable base 6 has a rotation mechanism that rotates an attached member. The check unit 3, the first cleaning member 4, and the second cleaning member 5 are arranged at respective positions of different phases about a rotation axis of the rotation mechanism. This rotation mechanism can rotationally drive each of the check unit 3 and the first cleaning member 4 so that the front face of each of these components comes to a position facing the fixing unit 2 (i.e., the image sensor surface of the image sensor 22), similar to the second cleaning member 5.

The rotation mechanism of the movable base 6 is also used to control the inclination (angle) of each of the cleaning members with respect to the detection surface, in a cleaning sequence to be described below of each of these members. In other words, the rotation mechanism controls the inclination of an ejection outlet when the first cleaning member 4 ejects air toward the detection surface of the image sensor 22, and controls the inclination of the wiper (and core) when the second cleaning member 5 wipes the detection surface, based on control by the control unit 10. As described above, due to the translation mechanism and the rotation mechanism of the movable base 6, the control unit 10 can control the distance to the detection surface, by causing each of the components to face, approach, and retract from the fixing unit 2, i.e., the detection surface of the detection element.

The check unit 3 includes an illuminator and irradiates an object with illumination light, based on an instruction of the control unit 10. In the present exemplary embodiment, a light emitting diode (LED) is mounted at the tip of the member. This is used to irradiate the image sensor 22 in a state where the image sensor 22 is brought close to the check unit 3 so as to capture an image of the element surface (a sensor plane) of the image sensor 22, thereby acquiring an image for checking a state of dirt on the plane. In the exemplary embodiment to be described below, the image of the sensor surface is acquired by using an image capturing function of the image sensor 22, but the present invention is not limited to this example. The check unit 3 may have some type of sensor, such as an image sensor, to acquire information based on which the state of the detection element surface can be checked. Further, in the present exemplary embodiment, the check unit 3 is attached to the movable base 6 together with the first cleaning member 4 and the second cleaning member 5. However, the check unit 3 may be, for example, installed and fixed near the fixing unit 2. Such installation enables irradiation and image capturing, during execution of the cleaning by each of the cleaning members as well. Furthermore, an illuminator and/or an image sensor may be provided as the check unit 3, near each of the cleaning portion (an ejection port) of the first cleaning member 4 and the cleaning portion (the wiper at the tip of the core) of the second cleaning member 5.

The first cleaning member 4 is a cleaning tool that performs the non-contact type cleaning on the detection element surface. In the present exemplary embodiment, the first cleaning member 4 blows off foreign particles adhering to the surface of the image sensor 22 by wind pressure in the proximity state with the image sensor 22, by ejecting air from the tip (the ejection port) of a tube-shaped member. Further, in the present exemplary embodiment, the first cleaning member 4 has an ionizer having a static elimination function that is obtained by electrically charging air so that foreign particles adhering to the surface of the image sensor 22 can be decharged and easily removed. However, performing only the ejection of air produces a certain level of effect without having such a static elimination function, and thus, the ionizer is not necessarily required.

The second cleaning member 5 is a cleaning tool that performs the contact-type cleaning on the detection element surface. In the present exemplary embodiment, wipe cleaning using the wiper typically attached to the tip of the core is performed. Foreign particles are caught by directly rubbing the surface of the image sensor 22 that has approached the tip of the core. For example, a cloth, a piece of paper, or a piece of tape made of super ultrafine fibers is used for the wiper. The wiper is configured to be retractable such that while the second cleaning member 5 performs the wipe cleaning by moving in contact with the cleaning surface, a new part of the wiper comes in contact with the cleaning surface. In the present exemplary embodiment, the second cleaning member 5 is configured to perform cleaning using the wiper soaked in a solvent for removing oil contamination, as necessary. The first cleaning member 4 and the second cleaning member 5 are not limited specific configurations in particular, as long as the first cleaning member 4 and the second cleaning member 5 are a non-contact type cleaning tool and a contact-type cleaning tool, respectively.

Figure 3:
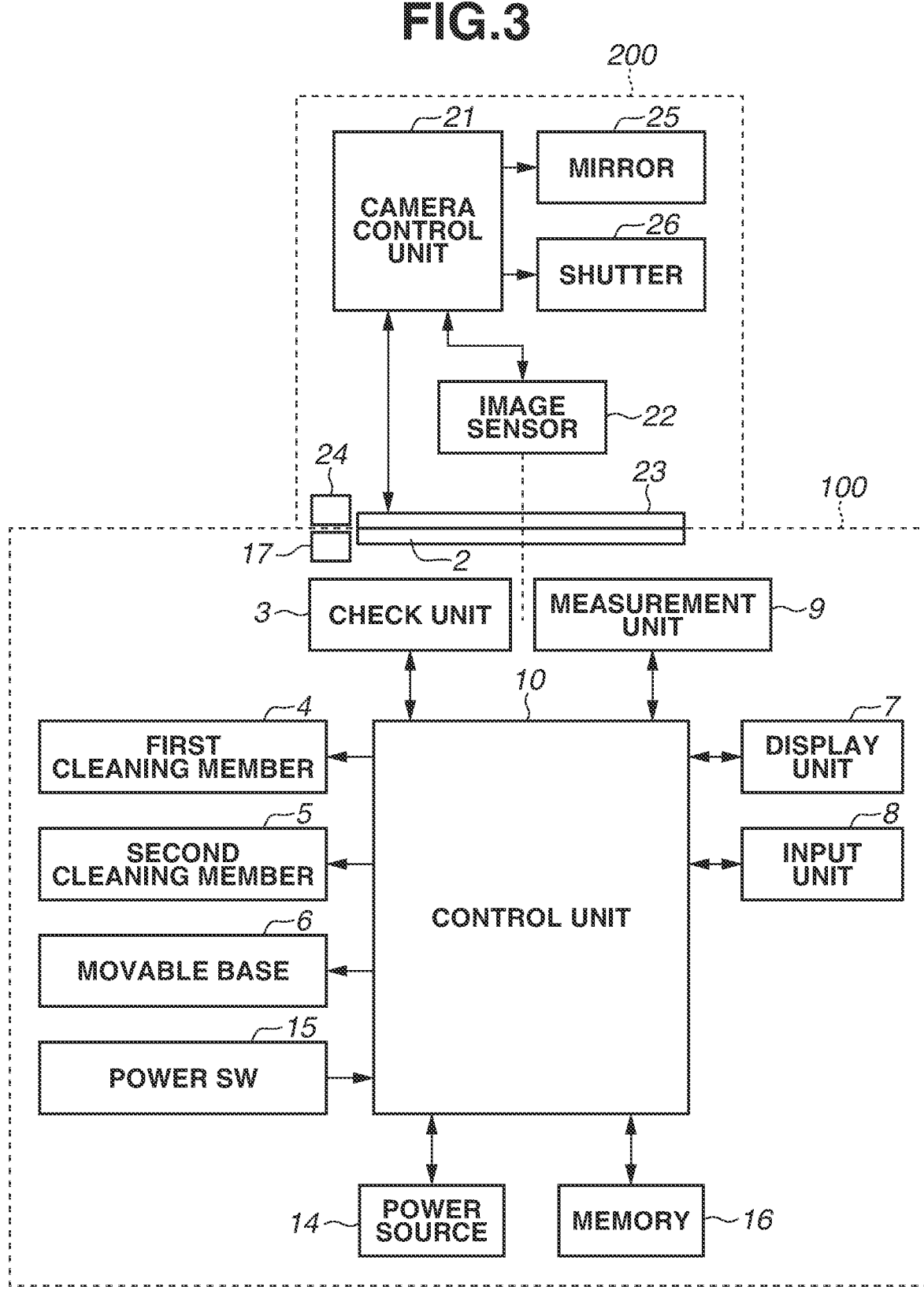
FIG. 3 is a block diagram illustrating a main configuration of each of the cleaning apparatus and the imaging apparatus according to the present exemplary embodiment.

FIG. 3 is a block diagram illustrating a main electrical configuration of each of the cleaning apparatus 100 and the camera 200 according to the present exemplary embodiment.

The cleaning apparatus 100 operates with electric power supplied from the power source 14, and a power switch (SW) 15 switches the power supply state of the cleaning apparatus 100 between a power-on state and a power-off state. The display unit 7 displays various kinds of information, such as various kinds of information about the cleaning apparatus 100 and the camera 200, operation statuses, settings made by user operations, and guidance for user operations, based on instructions from the control unit 10.

Information about an external device that has been stored in a memory 16 or acquired via the communication unit 17 or other communication path is input into an input unit 8, in order to perform appropriate operation depending on an attached camera. Various kinds of instruction information based on user operations are also input into the input unit 8. In the present exemplary embodiment, model information and information about specifications of the camera 200 to be connected are acquired as the information about the external device via the input unit 8.

A measurement unit 9 includes a laser distance meter. The measurement unit 9 measures the position (such as coordinates, and a distance to the image sensor) and the size of the image sensor 22 of the connected camera 200, and measures the position of the tip of the second cleaning member 5. This makes it possible to measure a distance between the image sensor 22 and the tip of the second cleaning member 5, and an inclination attributable to a failure in paralleling. The control unit 10 receives adjustment information based on the distance and the inclination measured by the measurement unit 9 and notifies the user of the received information. As for a method of the notification, in the present exemplary embodiment, for example, the control unit 10 displays the adjustment information on the display unit 7. In addition, for example, the control unit 10 may make the notification using sound and/or light associated with the adjustment information. The measurement unit 9 is not necessarily provided to measure the position and the size if the model information about a camera to be attached is determined, and the corresponding cleaning program is stored in a memory. The control unit 10 that is composed of a computer including a CPU built in the main body 1 of the cleaning apparatus 100, and controls the operation of the cleaning apparatus 100. The control unit 10 processes information from each of the components and provides an instruction to each of the components.

When the camera fixing unit 23 is attached to the fixing unit 2, the connection terminal provided in the fixing unit 2 detects electrical connection with the connection terminal (eight connection terminals in a lower part in FIG. 2) of the camera fixing unit 23, and then the control unit 10 detects connection of the camera 200.

The communication unit 17 performs communication with the detection device having the detection element. In the present exemplary embodiment, the communication unit 17 is a connection terminal compliant with the USB standard, and is to be electrically connected to the camera communication unit 24 of the camera 200 via a connection cable. When the connection cable is connected to the terminal of each of the communication unit 17 and the camera communication unit 24 in a state where the cleaning apparatus 100 and the camera 200 are both in the power ON state, power is supplied and communication is established. The method of communication between the cleaning apparatus 100 and the camera 200 is not limited to this example, and known communication methods are also applicable, including a wired local area network (LAN), High Definition Multimedia Interface (HDMI®), and a wireless LAN (including wireless fidelity (Wi-Fi®), Bluetooth®, and Bluetooth® Low Energy (BLE).

Next, a configuration example of the camera 200 detachably connected to the cleaning apparatus 100 will be described. The camera control unit 21 is a microcomputer, and performs control of the entire camera 200, including control for operation of the image sensor 22, storage of captured images, and data communication.

The image sensor 22 is disposed at a position that is accessible from an opening portion provided in the camera mount. Normally, the image sensor 22 has a detection surface composed of a photodiode and receives a light beam from an object in a state where an image capturing lens is attached. The light beam received by the image sensor 22 is converted into an electrical signal, so that image data is output.

A mirror 25 is located on an optical axis on the object side of the image sensor 22 in the camera 200. The mirror 25 reflects or disperses light to be transmitted to the image sensor 22, to components other than the image sensor 22, such as a sensor and an optical viewfinder (not illustrated). It is necessary to retract the mirror 25 sufficiently from a position on the optical axis of the image sensor 22 during cleaning of the image sensor 22. In the present exemplary embodiment, in the camera 200, the mirror 25 is retracted from the position on the optical axis to the extent that the member of the cleaning apparatus 100 can approach the image sensor 22 during cleaning, using a mechanism for retracting the mirror 25 from the position on the optical axis during exposure of the image sensor 22. In the present exemplary embodiment, the camera 200 serving as the detection device is a digital single-lens reflex camera having the mirror 25, but the present exemplary embodiment is also applicable to a mirrorless single lens camera having no optical finder and no mirror.

A shutter 26 is located on the object side of the image sensor 22 in the camera 200, and has a role as a light-shielding member for shielding the image sensor 22 from light during image capturing.

Next, operating sequences of the cleaning apparatus 100 will be described will be described with reference to FIGS. 4A, 4B, and 4C.

Figure 4A:
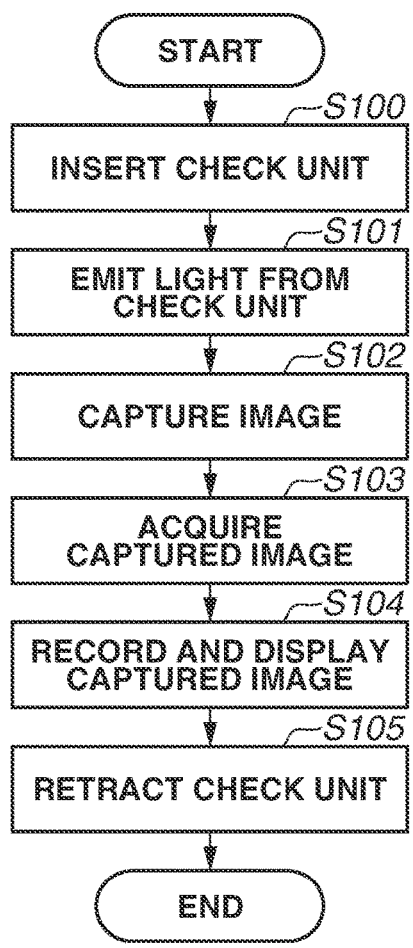
FIGS. 4A, 4B, and 4C are flowcharts each illustrating a sequence of the cleaning apparatus according to the present exemplary embodiment.

FIG. 4A is a flowchart illustrating a check sequence for checking a state (a state of dirt, or a cleaning state) of the detection element surface of the cleaning target using the check unit 3. The control unit 10 appropriately performs operation of this flow or provides an operation instruction to each of the components, in the entire cleaning sequence to be performed by the cleaning apparatus 100. In a stage before this check sequence begins, the camera 200 has been already fixed to the cleaning apparatus 100 by the camera fixing unit 23 and the fixing unit 2, and communication with the camera 200 has been established by connection between the communication unit 17 and the camera communication unit 24 via the USB-compliant connection cable.

First, in step S100, the control unit 10 directs the check unit 3 toward the fixing unit 2 by controlling the movable base 6, and then brings the tip of the check unit 3 closer to the image sensor 22 by moving the check unit 3 such that the tip passes through the fixing unit 2 and the camera fixing unit 23. In step S101, in proximity to the image sensor 22, the check unit 3 irradiates the image sensor 22 with light emitted from a point light source such as the LED provided at the tip. The form of the illuminator is not limited to the point light source, and other type is applicable. However, it is desirable to use the point light source because it is easy to have uniform light is likely to be uniformly incident on each element and thus the state of the detection surface can be measured on substantially the same condition.

In step S102, in the state where the above-described irradiation is performed by the illuminator, the control unit 10 transmits a signal to the camera control unit 21 via the communication unit 17 and the camera communication unit 24, so that the image sensor 22 performs imaging operation to capture an image. In step S103, the control unit 10 acquires the captured image. In step S104, the acquired image is recorded into the memory 16 via the communication unit 17 and is converted into an image for display. The image is then displayed on the display unit 7. In this process, the control unit 10 detects a state of the image sensor surface and information about foreign particles or dirt from the recorded captured image by a known image analysis, such as singularity detection, and displays the result of the detection on the display unit 7 together with the image. In the present exemplary embodiment, a check of the initial state of the image capturing surface, cleaning completion determination after cleaning, and presentation of a comparison between states before and after the cleaning are performed based on the above-described pieces of information. In the present exemplary embodiment, in the check sequence after some cleaning, a comparison between states before and after the cleaning is presented on the display unit 7 as a result of the checking, so that the user can be notified of an effect of the cleaning and the presence of remaining foreign particles. In step S105, after image recording, the check unit 3 retracts from the vicinity of the image sensor 22 to the cleaning apparatus side, and the check sequence is ended.

Figure 4B:
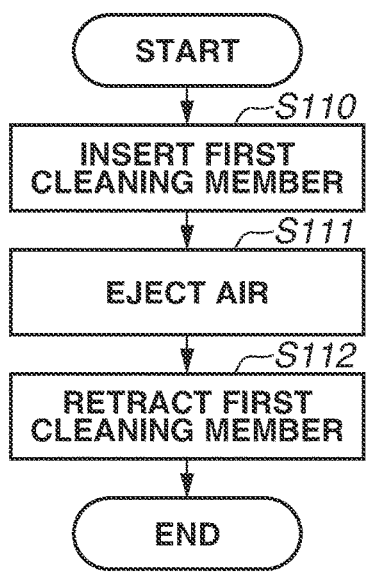

FIG. 4B is a flowchart illustrating a first cleaning sequence for cleaning the detection element surface by a non-contact type cleaning method using the first cleaning member 4. The control unit 10 performs operation of this flow or provides an operation instruction to each of the components as necessary, in the entire cleaning sequence to be performed by the cleaning apparatus 100. In a stage before this first cleaning sequence begins, the camera 200 has been already fixed to the cleaning apparatus 100 by the camera fixing unit 23 and the fixing unit 2, and communication with the camera 200 has been established via the camera communication unit 24 and the communication unit 17.

First, in step S110, the control unit 10 directs the first cleaning member 4 toward the fixing unit 2 by controlling the movable base 6, and then brings a portion (the tip) to be used for cleaning by the first cleaning member 4 closer to the image sensor 22 by moving the first cleaning member 4 such that the tip passes through the fixing unit 2 and the camera fixing unit 23. Afterward, in step S111, the first cleaning member 4 ejects air from the ejection port at the tip, in the vicinity of the image sensor 22.

Figure 6A:
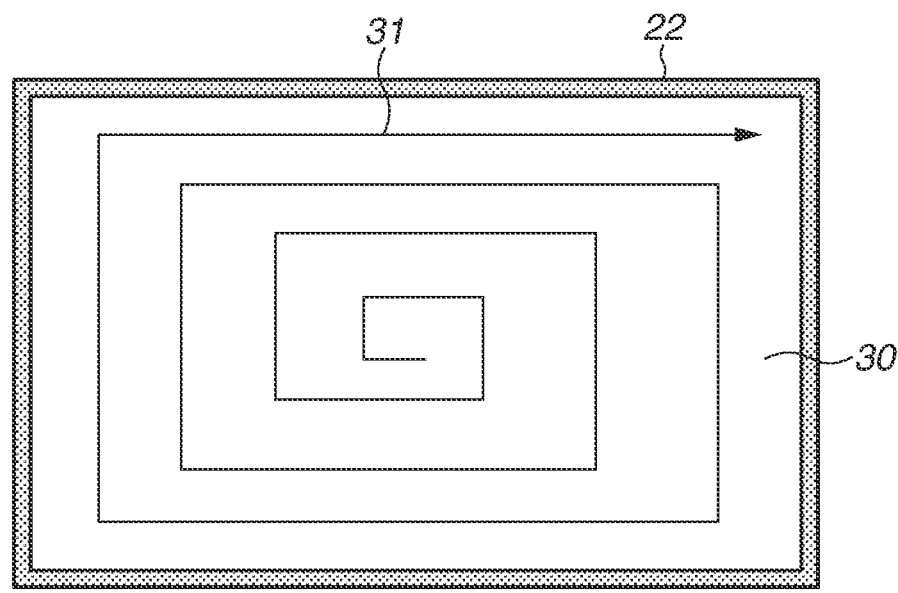
FIGS. 6A and 6B are diagrams illustrating an image sensor in a first cleaning sequence according to the present exemplary embodiment.
Figure 6B:
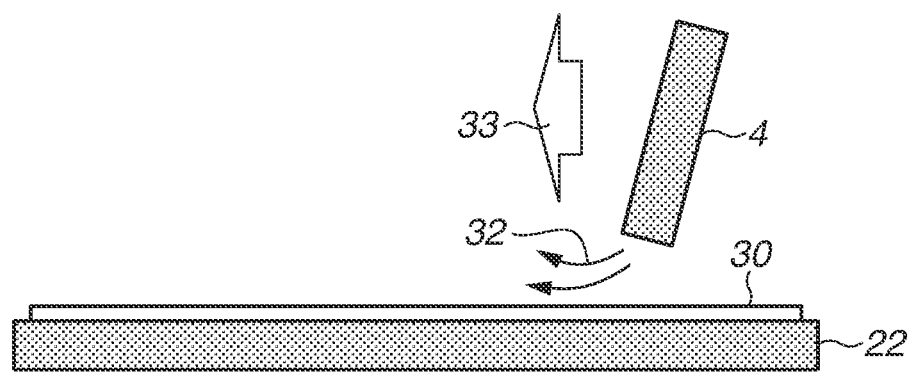

FIGS. 6A and 6B are conceptual diagrams illustrating the cleaning method using the first cleaning member 4 in step S111. FIG. 6A illustrates an image sensor surface 30 of the image sensor 22 as viewed from the front face thereof. FIG. 6B illustrates the image sensor surface 30 of the image sensor 22 as viewed from the side face thereof and illustrates a state where the first cleaning member 4 that has approached the image sensor surface 30 ejects air toward the image sensor surface 30.

The control unit 10 causes the first cleaning member 4 to eject air while moving the first cleaning member 4 along a path indicated with a movement trajectory 31 for the image sensor surface 30 of the image sensor 22 as illustrated in FIG. 6A, by controlling the movable base 6. In addition, as illustrated in FIG. 6B, the first cleaning member 4 is controlled to eject air in a traveling direction 33 while moving. The movement trajectory 31 is set to spread outward in a spiral form from a central portion of the image sensor 22. Taking such a trajectory makes it possible to blow off foreign particles adhering to the image sensor surface 30 to the outside of the image sensor 22 and to prevent the blown-off foreign particles from adhering to the image sensor surface 30 again. Further, the first cleaning member 4 is moved while being tilted to eject air in the traveling direction 33. This can produce an effect of blowing off the foreign particles further to the outside of the image sensor 22, and also allows the first cleaning member 4 to move while avoiding the light-shielding member located near an end portion of the image sensor surface 30.

In this way, the first cleaning member 4 can remove relatively large solid foreign particles and dust adhering to the image sensor surface 30 of the image sensor 22 from the surface, with the ejected air. Here, for example, if the first cleaning member 4 performs cleaning by rubbing the image sensor surface 30 as in the method using the second cleaning member 5 in a state where large solid foreign particles are present on the image sensor surface 30, the image sensor surface 30 can be damaged by the foreign particle dragged on the surface. In contrast, in the method of removing foreign particles in a non-contact manner using the first cleaning member 4, foreign particles are not dragged on the image sensor surface 30, which can produce an effect of preventing the image sensor surface 30 from being damaged.

In addition, in the present exemplary embodiment, the control unit 10 controls the movable base 6 to prevent the first cleaning member 4 from coming in contact with the image sensor surface 30 of the image sensor 22 in the first cleaning sequence. This can further reduce the possibility of damaging the image sensor surface 30 of the image sensor 22. In step S112, upon ejecting the air, the first cleaning member 4 retracts from the position in the vicinity of the image sensor 22, and the first cleaning sequence is ended.

Figure 4C:
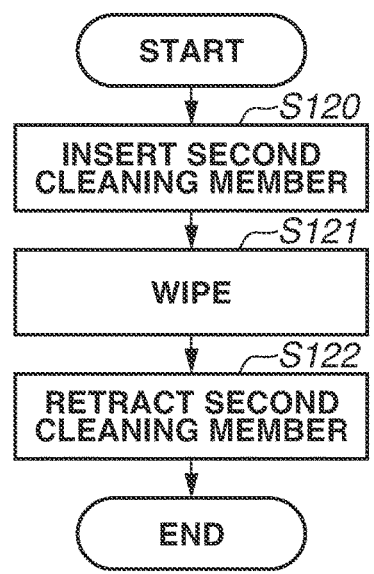

FIG. 4C is a flowchart illustrating a second cleaning sequence for performing the contact-type cleaning for the surface of the detection element using the second cleaning member 5. The control unit 10 appropriately performs operation of this flow or provides an operation instruction to each of the components, in the entire cleaning sequence to be performed by the cleaning apparatus 100. In a stage before this second cleaning sequence begins, the camera 200 has been already fixed to the cleaning apparatus 100 by the camera fixing unit 23 and the fixing unit 2, and communication with the camera 200 has been established by connection between the communication unit 17 and the camera communication unit 24 via the USB-compliant connection cable.

First, in step S120, the control unit 10 directs the second cleaning member 5 toward the fixing unit 2 by controlling the movable base 6, and then brings a portion (the tip) to be used for cleaning by the second cleaning member 5 closer to the image sensor 22 by moving the second cleaning member 5 such that the tip passes through the fixing unit 2 and the camera fixing unit 23. Here, in a case where the solvent for removing oil contamination is used for wipe cleaning, the movable base 6 is controlled to dip the tip of the second cleaning member 5 in the solvent in a container provided at another rotation position and then direct the second cleaning member 5 toward the fixing unit 2. Afterward, in step S121, the tip is brought into contact with the image sensor 22, and the second cleaning member 5 wipes the surface of the image sensor 22 using the wiper (such as a cloth, or a piece of paper) attached to the tip in the vicinity of the image sensor 22.

Figure 7A:
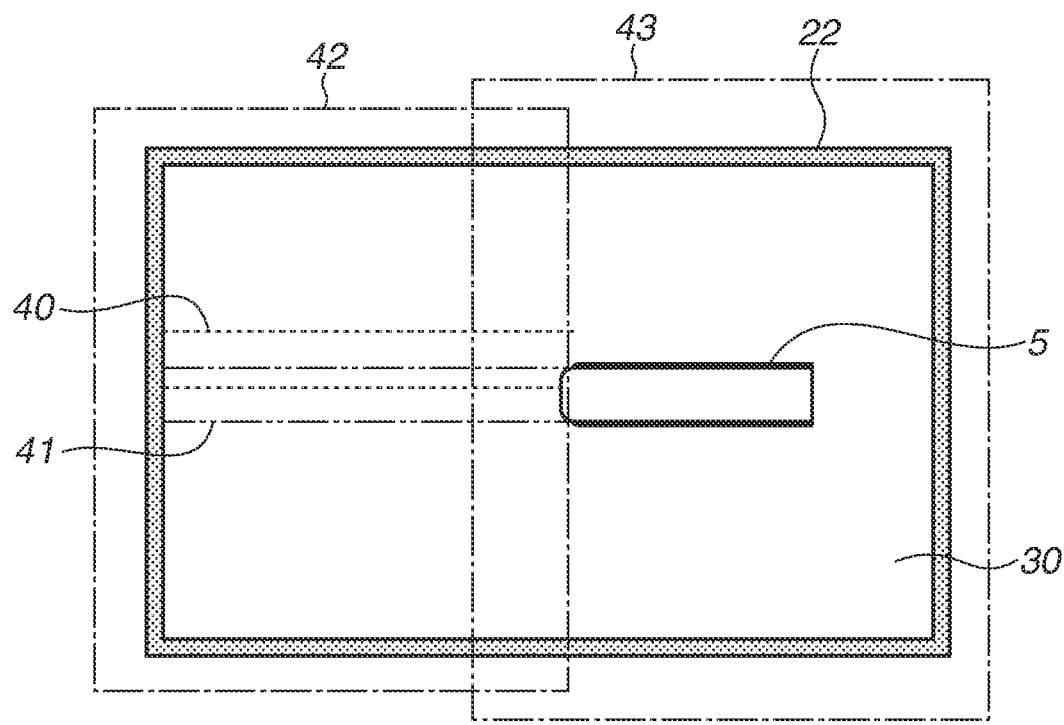
FIGS. 7A and 7B are diagrams illustrating the image sensor in a second cleaning sequence according to the present exemplary embodiment.
Figure 7B:
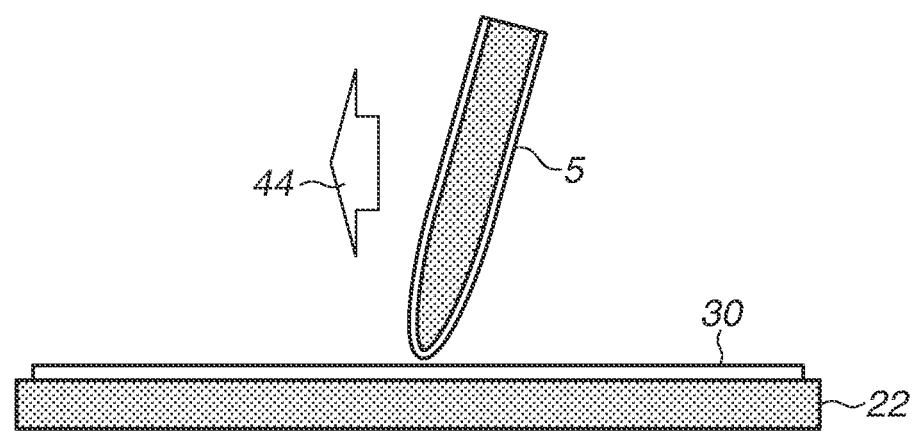

FIGS. 7A and 7B are conceptual diagrams illustrating the cleaning method using the second cleaning member 5 in step S121. FIG. 7A illustrates the image sensor surface 30 of the image sensor 22 as viewed from the front face thereof. FIG. 7B illustrates the image sensor surface 30 of the image sensor 22 as viewed from the side face thereof, and illustrates a state where the second cleaning member 5 wipes the image sensor surface 30 with the wiper at the tip in contact with the image sensor surface 30.

As illustrated in FIG. 7A, the control unit 10 causes the second cleaning member 5 to perform wipe cleaning with the wiper at the tip while moving the second cleaning member 5 with respect to the image sensor surface 30 of the image sensor 22 by controlling the movable base 6. In addition, as illustrated in FIG. 7B, the second cleaning member 5 is controlled to move while being in contact with the image sensor surface 30, in a state where the second cleaning member 5 is tilted with respect to a traveling direction (a cleaning direction) 44 while moving.

As illustrated in FIG. 7A, the second cleaning member 5 performs the wipe cleaning while sequentially scanning cleaning areas as indicated by a first movement trajectory 40 and a second movement trajectory 41 such that the cleaning areas partially overlap each other. Further, a first cleaning area 42 and a second cleaning area 43 partially overlap to prevent any portion of the image sensor surface 30 from remaining unwiped. Each of these cleaning areas is set in a wide area spreading beyond the edge of the image sensor surface 30 in order to wipe the image sensor surface 30 without omitting any portion. Moreover, to prevent any portion from remaining unwiped in each of these cleaning areas and to push foreign particles to the outside of the image sensor surface 30, it is desirable to perform the wipe cleaning, basically, in the identical direction. FIG. 7B illustrates a state where the wipe cleaning is performed in the cleaning direction 44 within the first cleaning area 42. In this state, the second cleaning member 5 is in contact with the image sensor surface 30 while being tilted in the direction opposite to the cleaning direction 44, so that the second cleaning member 5 slides easily. In a case where pixels at the end portion of the image sensor surface 30 are covered with the light-shielding member, the second cleaning member 5 can perform the wipe cleaning thoroughly without contact with the light-shielding member by performing scan while being tilted as illustrated in FIG. 7B.

The second cleaning member 5 can remove foreign particles and dirt such as highly adhesive oil adhering to the surface of the image sensor 22 from the surface by performing the cleaning in the above-described procedure. In step S122, after the cleaning, the second cleaning member 5 retracts from the position in the vicinity of the image sensor 22, and the second cleaning sequence is ended.

Figure 5:
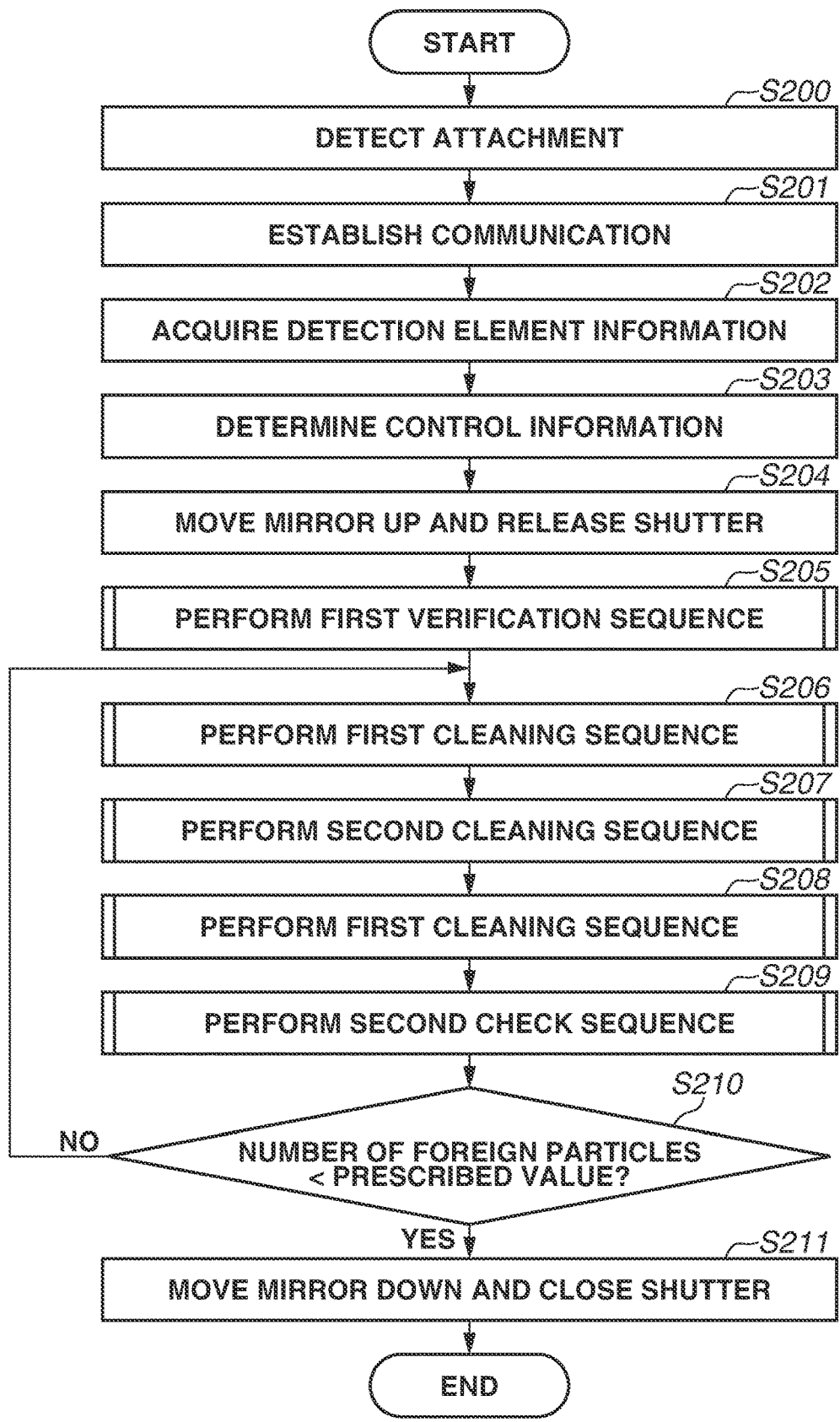
FIG. 5 is a flowchart illustrating a series of steps of a cleaning sequence according to the present exemplary embodiment.

Next, a flow of the entire cleaning sequence according to the present exemplary embodiment will be described with reference to a flowchart in FIG. 5. This flow starts in response to, for example, power-on by an operation on the power SW 15 or receipt of an instruction for starting the cleaning process from the input unit 8. The control unit 10 performs each step of operation in this flow or provides an instruction for each step of operation to each of the components.

In step S200, the control unit 10 detects that the camera fixing unit 23 of the camera 200 is attached and fixed to the fixing unit 2, using the connection terminal provided in the fixing unit 2. Next, in step S201, the control unit 10 detects that the communication unit 17 and the camera communication unit 24 are electrically connected to each other, and upon detecting the electrical connection, communication is established between the cleaning apparatus 100 and the camera 200.

Next, in step S202, the control unit 10 acquires detection element information on the detection element to be cleaned. As the detection element information, for example, information such as the position, size, and material of the image sensor 22, and the position of a member that hinders cleaning of the image sensor 22 is acquired. These pieces of information may be acquired from the camera 200 by communication or may be read out from a database stored beforehand in the memory 16 based on the model information acquired from the camera 200. The detection element information or the model information about the camera 200 may be acquired by a user input via the input unit 8. In a case where a sensor for detecting the state of the image sensor 22 is provided in the check unit 3, the above-described detection element information is acquired in this step based on information such as an image detected by the check unit 3.

In step S203, the control unit 10 determines control information based on the detection element information about the image sensor 22 acquired in step S202. Specifically, based on the position and size information about the image sensor 22, the control unit 10 determines a driving width for advancing and retracting each of the check unit 3, the first cleaning member 4, and the second cleaning member 5, an air ejection position and an ejection strength of air ejected from the first cleaning member 4, a range of wipe cleaning by the second cleaning member 5, and presence/absence of the solvent to be applied to the wiper. Further, in step S203, in the present exemplary embodiment, the adjustment mechanism performs correction (adjustment) of the positional relationship between each of the cleaning members and the image sensor 22 of the camera 200 as described above. The control unit 10 displays, on the display unit 7, adjustment information based on the distance and between the cleaning member (for example, the second cleaning member 5) and the image sensor surface 30 and the inclination of the cleaning member with respect to the image sensor surface 30 that are measured by the measurement unit 9. In this process, since a proper distance is apparent from the detection element information about the image sensor 22 and thus a positional shift amount (distance) of the cleaning member can be detected, this positional shift amount may be displayed as the adjustment information alone or together with the distance and the inclination. In other words, a shift amount from a position and an inclination suitable for cleaning is calculated based on the type of the detection element and the current distance (the position of the image sensor 22 or the fixing unit 2) and the inclination of the detection element, and shift information based on the calculated shift amount is displayed as the adjustment information. Further, the control unit 10 sequentially notifies the adjustment information based on the results of consecutive measurements by the measurement unit 9. The user corrects the position of each of the cleaning members and the image sensor 22 by adjusting the position of the fixing unit 2 using the adjustment mechanism provided between the fixing unit 2 and the main body 1, while confirming the notified results. In the present exemplary embodiment, a plurality of cleaning courses using at least one of the first cleaning member 4 and the second cleaning member 5 is prepared. For example, the user can select a cleaning course from a plurality of candidates displayed on the display unit 7, considering factors such as a state of contamination and a work time. For example, the followings are prepared as the courses. In the present exemplary embodiment, the subsequent flow will be described assuming that a course 1 is selected. In a case where a course other than course 1 is selected, a step unnecessary for the selected course may be omitted (skipped by performing no operation) as appropriate. Settable courses are not limited to these examples, and courses that can be prepared by the user by freely setting various sequences including a cleaning order and the number of times of cleaning may be provided. In other words, the control unit 10 receives setting of a combination of cleanings by the first cleaning member 4 and the second cleaning member 5, among a plurality of patterns of combinations prepared beforehand, or by a manual operation. The control unit 10 then performs cleaning on the detection surface by controlling the cleaning order and the number of times of cleaning of the first cleaning member 4 and the second cleaning member 5, based on the received setting.

Course 1: first check sequence→first cleaning sequence→second cleaning sequence→first cleaning sequence→second check sequence Course 2: first check sequence→first cleaning sequence→second cleaning sequence→second check sequence Course 3: first check sequence→second cleaning sequence→first cleaning sequence→second check sequence Course 4: first check sequence→first cleaning sequence→second check sequence Course 5: first check sequence→second cleaning sequence→second check sequence Course 6: first check sequence In step S204, the control unit 10 transmits a signal representing an instruction for moving the mirror 25 up and releasing the shutter 26 to the camera control unit 21, in order to execute various sequences for the image sensor 22. Upon receiving the signal representing the instruction for moving the mirror up and releasing the shutter, the camera control unit 21 moves the mirror 25 up and releases the shutter 26. Subsequently, the camera control unit 21 transmits a signal for conveying the completion of the operation to the control unit 10. When the control unit 10 receives the signal, the operation proceeds to the next step. However, in some models of camera, such as the above-described mirrorless single lens camera, in which the image sensor 22 is not covered and cleaning can be performed without the processing in this step, it is not necessary to execute the processing in this step and subsequent steps. In this case, this step and step S211 to be described below are unnecessary.

In step S205, the control unit 10 performs the check sequence illustrated in FIG. 4A, as the first check sequence for the first time before cleaning. In step S206, the control unit 10 performs the first cleaning sequence illustrated in FIG. 4B using the first cleaning member 4 for the first time. In step S207, after the first cleaning sequence is ended, the control unit 10 performs the second cleaning sequence illustrated in FIG. 4C, using the second cleaning member 5. Here, the first cleaning sequence is performed before the second cleaning sequence. This is because large foreign particles are removed by the first cleaning sequence to prevent the surface from being damaged by dragging of large foreign particles adhering to the image sensor surface 30 when the wipe cleaning is performed by the second cleaning member 5.

In step S208, after the second cleaning sequence is ended, the control unit 10 performs the first cleaning sequence again for the second time using the first cleaning member 4. The operation in the sequence may be the same as or may be different from the processing in step S206. Here, the first cleaning sequence is performed after the second cleaning sequence, and the reason for this is as follows. In the wipe cleaning by the second cleaning member 5, fibers of the wiper may remain on the image sensor surface 30, or foreign particles pushed to the outside of the image sensor surface 30 remain on the periphery. Those types of foreign particle can be blown off and thereby removed by performing the first cleaning sequence after the second cleaning sequence.

In step S209, when the first cleaning sequence for the second time in step S208 is ended, the check sequence illustrated in FIG. 4A is performed as the second check sequence for the second time after the cleaning. A point different from the first check sequence before the cleaning is that images and states of foreign particles, such as the number of foreign particles, before and after the cleaning can be displayed in a comparable manner on the display unit 7, in step S104. In step S210, the control unit 10 determines whether the number of foreign particles is less than a prescribed value, based on the post-cleaning image information acquired in step S209. Here, if the prescribed value is not less than the prescribed value (NO in step S210), the operation returns to step S206 to perform the cleaning again. In this process, to remove foreign particles that remain even after each of the cleaning sequences has been performed, each of the cleaning sequences may be performed again by changing various parameters in the cleaning. For example, for the first cleaning member 4, the air ejection intensity can be set higher, the degree of charging by the ionizer can be set higher, the air ejection time can be set longer, or the movement range can be set wider than the last time. For the second cleaning member 5, the solvent can be applied to the wiper if the solvent is not applied to the wiper in the last cleaning, or the contact pressure against the image sensor surface 30 can be set higher than the last time.

If the prescribed value is less than the prescribed value (YES in step S210), the operation proceeds to step S211. In step S211, the control unit 10 transmits, to the camera control unit 21, a signal representing an instruction for moving the mirror 25 down and closing the shutter 26. Upon receiving the signal representing the instruction for moving the mirror down and closing the shutter, the camera control unit 21 moves the mirror 25 down and closes the shutter 26. Subsequently, the camera control unit 21 transmits a signal for conveying the completion of the operation to the control unit 10. When the control unit 10 receives the signal, the cleaning sequence is ended.

Here, in the present exemplary embodiment, the number of foreign particles remaining on the image sensor 22 is detected to check the cleaning state in step S210. However, this is not limitative and other analysis result may be used as a reference if this analysis indicates a state of the image sensor 22 that can be analyzed from an image. Further, in the present exemplary embodiment, there has been described the example in which each of the cleaning sequences is repeated until the number of foreign particles is less than the prescribed value. However, the result of cleaning such as the number of foreign particles may only be displayed on the display unit 7 without providing a particular loop in the flow.

As described above, in the present exemplary embodiment, after the cleaning is performed by the first cleaning member that cleans the detection surface of the detection element for detecting a physical quantity with wind pressure (air ejection), the cleaning is performed by the second cleaning member that performs wipe cleaning while being in contact with the detection surface. A plurality of kinds of foreign particles adhering to the detection surface can be thereby removed appropriately. Further, it is possible to remove fibers of the wiper and unremoved foreign particles in the cleaning as well as foreign particles remaining on the periphery of the detection surface by performing the non-contact type cleaning again after the wipe cleaning. Furthermore, it is possible to check the state of the detection surface before or after the cleaning, or the states of the detection surface before and after the cleaning, by capturing an image or images of the detection surface and displaying the captured image before or after the cleaning, or the captured images before and after the cleaning. In this process, the point light source is used as the light source that irradiates the detection surface, so that an image having a deeper depth of field and achieving easier recognition of foreign particles can be acquired. This makes it easy to visually recognize or detect foreign particles remaining on the detection surface. Moreover, it is possible to analyze the state of foreign particles by analyzing the captured image of the detection surface, and the number of foreign particles can be displayed or display that increases visibility of foreign particles can be performed.

Further, because the cleaning apparatus includes the plurality of cleaning members that can perform the plurality of cleaning sequences, the cleaning apparatus can remove a plurality of kinds of foreign particles adhering to the detection surface of the detection element included in the detection device.

Figure 8A:
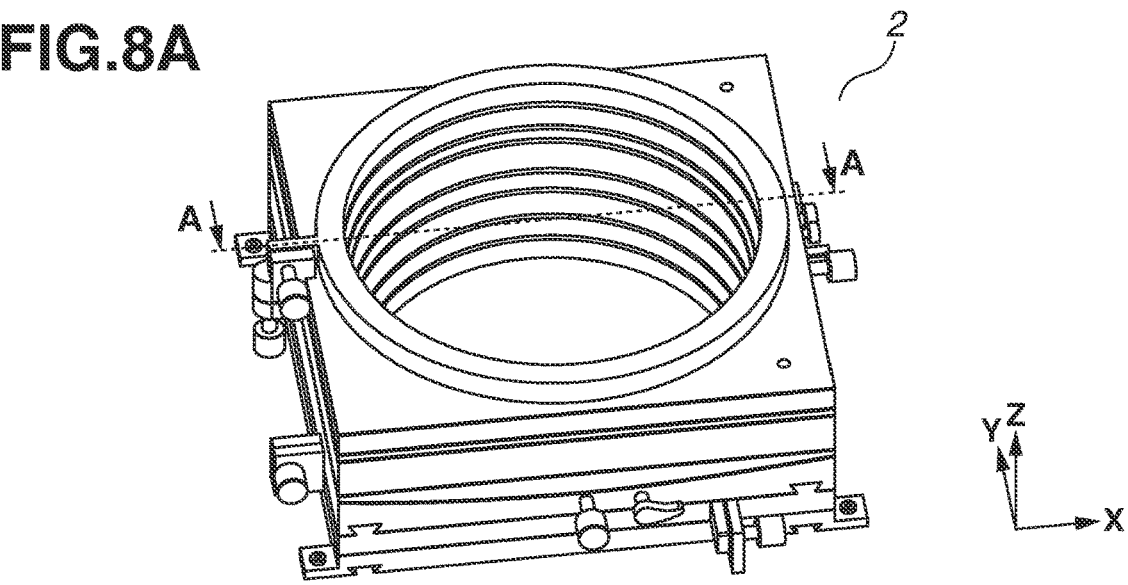
FIGS. 8A, 8B, and 8C are diagrams illustrating details of a fixing unit of the cleaning apparatus according to the exemplary embodiment.
Figure 8B:
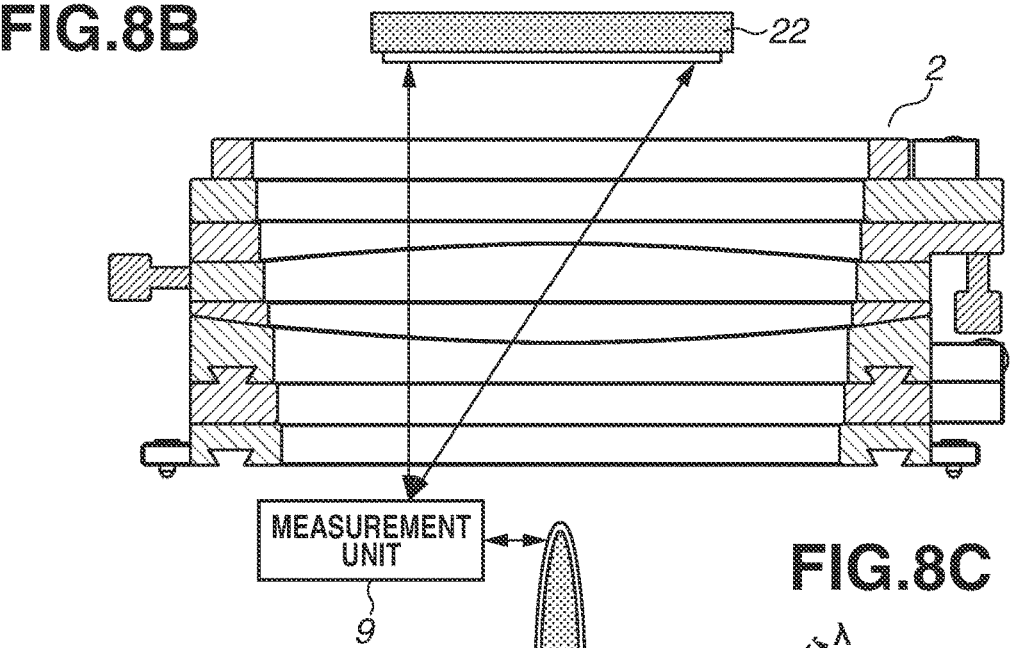
Figure 8C:
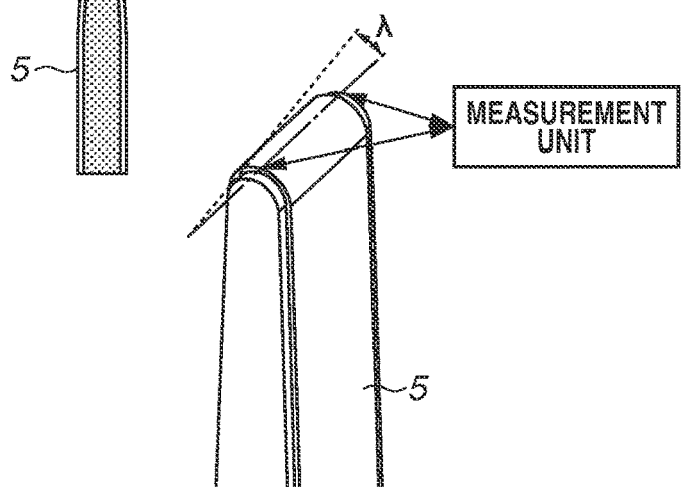
Figure 9A:
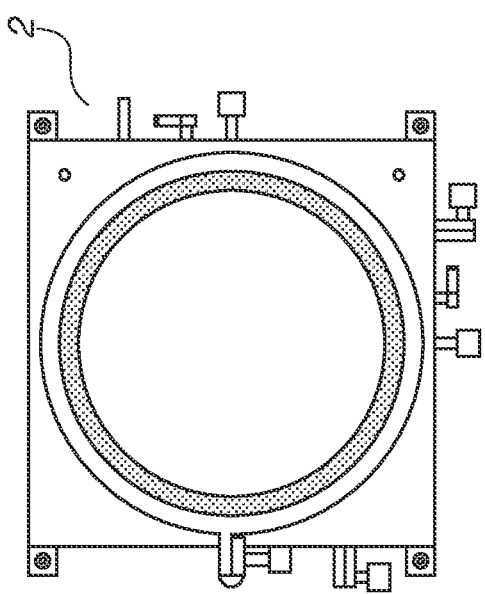
FIGS. 9A, 9B, 9C, and 9D are diagrams illustrating details of the fixing unit of the cleaning apparatus according to the exemplary embodiment.
Figure 9D:
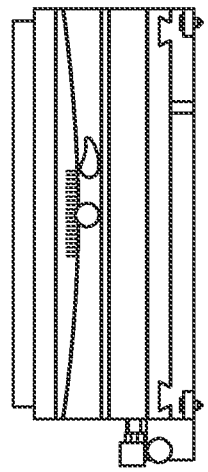
Figure 9C:
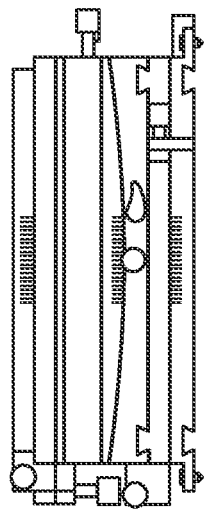
Figure 9B:
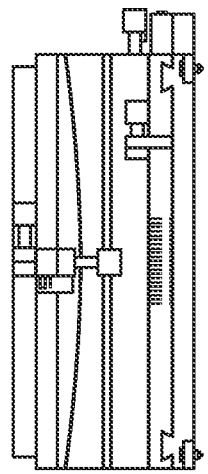

Next, an adjustment (correction) method by the adjustment mechanism for the position of each of the camera 200 and the cleaning apparatus 100 will be described with reference to FIGS. 8A to 8C and 9A to 9D. FIGS. 8A to 8C and 9A to 9D illustrate details of the fixing unit 2 of the cleaning apparatus 100. FIG. 8A is a front perspective view of the fixing unit 2. FIG. 8B is a diagram illustrating a cross section, taken along a broken line in FIG. 8A, of the fixing unit 2 as viewed from an arrow A, the image sensor 22, and the second cleaning member 5. FIG. 8C is an enlarged view of the tip of the second cleaning member 5. FIGS. 9A, 9B, 9C, and 9D illustrate a top view, a left-side view, a front view, and a right-side view of the fixing unit 2, respectively.

The above-described configuration enables the user to correct the position and the inclination of each of the image sensor surface 30 and the tip of the second cleaning member 5, by performing an adjustment using the adjustment mechanism. Specifically, the user adjusts each stage, based on the position and inclination information displayed on the display unit 7. Further, it is more desirable that the control unit 10 have a configuration that prompts a user operation by displaying, for example, a correction procedure or a correction order in a graphical user interface (GUI) on the display unit 7. In the present exemplary embodiment, the configuration in which the user manually performs correction is provided. However, the control unit 10 can automatically adjusts the camera 200 to a suitable position based on a measurement result from the measurement unit 9 to perform the correction, by providing a drive unit including a motor in each adjustment mechanism. Further, in the present exemplary embodiment, a configuration that can adjust six axes is provided. However, any configuration is acceptable if the configuration can adjust at least $\lambda$ and H that can cause damage to the image capturing surface because of an inclination with respect to the tip of the second cleaning member 5. Furthermore, it is desirable to dispose a layer of the adjustment mechanism of an angle such as $\Omega\lambda$ on the camera 200 side (the detection element side), not on the main body side of the cleaning apparatus 100, where possible, as compared with other adjustment axes, in terms of stroke. Moreover, among the adjustments of the six axes, the adjustment to a plane perpendicular to an XY$\theta$ axis in the gravity direction thereof may be performed on the cleaning apparatus side, as compared with other adjustment axes.

Exemplary embodiments of the present invention are described above, but the present invention is not limited to these exemplary embodiments, and various modifications and alterations can be made within the scope of the gist thereof.

Other Exemplary Embodiments

Exemplary embodiments of the present invention can also be achieved as follows. A storage medium that stores a program code of software describing a procedure for implementing a function of each of the above-described exemplary embodiments is supplied to a system or apparatus. A computer (or a device such as a CPU and a micro processing unit (MPU)) of the system or apparatus reads out the program code stored in the storage medium and executes the read-out program code.

In this case, the program code read out from the storage medium implements a new function of the present invention, and the storage medium storing the program code and the program form an exemplary embodiment of the present invention.

Examples of the storage medium for supplying the program code include a flexible disk, a hard disk, an optical disc, and a magneto-optical disk. Storage mediums that can also be used include a compact disc read only memory (CD-ROM), a CD-Recordable (CD-R), a CD-Rewritable (CD-RW), a digital versatile disc ROM (DVD-ROM), a DVD random access memory (DVD-RAM), a DVD-RW, a DVD-R, a magnetic tape, a nonvolatile memory card, and a ROM.

The function of each of the above-described exemplary embodiments is implemented by the computer executing the read-out program code. It also includes a case where software such as an operating system (OS) running on the computer performs a part or all of actual processing based on an instruction of the program code, so that the function of each of the above-described exemplary embodiments is implemented by the processing.

The following case is also included. First, the program code read out from the storage medium is written into a memory included in a function expansion board inserted into the computer or a function expansion unit connected to the computer. Afterward, a device such as a CPU included in the function expansion board or function expansion unit performs a part or all of actual processing based on an instruction of the program code.

According to the exemplary embodiments of the present invention, it is possible to appropriately remove a plurality of kinds of foreign particles adhering to a detection surface of a detection element.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-176519, filed Sep. 20, 2018, which is hereby incorporated by reference herein in its entirety.

What is claimed is:

1. A cleaning apparatus that includes a cleaning member and cleans a detection surface of a detection element included in a detection device, the cleaning apparatus comprising:
   a fixing unit configured to fix the detection device attached to the cleaning apparatus;
   an adjustment mechanism configured to adjust a position of the detection device with respect to the cleaning apparatus, and including a plurality of stages, each stage having at least two axes and an opening portion for enabling the detection element to face the cleaning member; and a measurement unit configured to measure a position and an inclination of the detection element of the detection device.

2. The cleaning apparatus according to claim 1, further comprising:

a control unit configured to notify adjustment information based on the position and the inclination of the detection element measured by the measurement unit, wherein the adjustment mechanism adjusts the position based on a user operation.

3. The cleaning apparatus according to claim 2, wherein the control unit consecutively notifies the inclination that is consecutively measured by the measurement unit, as the adjustment information.

4. The cleaning apparatus according to claim 2, wherein the control unit calculates a shift from a position and an inclination suitable for cleaning by the cleaning member based on a type of the detection element and the position and the inclination measured by the measurement unit, and notifies shift information based on the shift, as the adjustment information.

5. The cleaning apparatus according to claim 2, wherein the control unit notifies an adjustment procedure by the adjustment mechanism.

6. The cleaning apparatus according to claim 1, further comprising: a drive unit configured to automatically adjust the adjustment mechanism, based on a result of measurement of the position and the inclination by the measurement unit.

7. The cleaning apparatus according to claim 1, wherein the adjustment mechanism is configured to adjust an axis of each of a plurality of layers between a main body of the cleaning apparatus and the fixing unit, and wherein a layer for adjusting an angle is provided on the detection element side relative to a layer for adjusting a position.

8. A non-transitory computer-readable storage medium that stores a program executable by a computer for serving as units of a cleaning apparatus that includes a cleaning member and cleans a detection surface of a detection element included in a detection device, the cleaning apparatus comprising:

a fixing unit configured to fix the detection device attached to the cleaning apparatus;

an adjustment mechanism configured to adjust a position of the detection device with respect to the cleaning apparatus, and including a plurality of stages, each stage having at least two axes and an opening portion for enabling the detection element to face the cleaning member; and a measurement unit configured to measure a position and an inclination of the detection element of the detection device.

* * * * *